United States Patent Office 3,780,099
Patented Dec. 18, 1973

---

3,780,099
PROCESS FOR PREPARING CHELATING AGENTS
Patricia M. Scanlon, Arlington, Mass., and Jon C. Thunberg, Amherst, N.H., assignors to W. R. Grace & Co., New York, N.Y.
No Drawing. Original application June 14, 1971, Ser. No. 152,987, now Patent No. 3,689,544. Divided and this application Apr. 25, 1972, Ser. No. 247,392
Int. Cl. C07c *99/00*
U.S. Cl. 260—534 E  6 Claims

ABSTRACT OF THE DISCLOSURE

A chelating agent having the formula

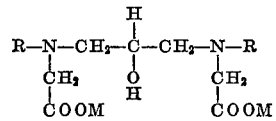

wherein; R is an alkyl group having about 1–20 carbon atoms, hydrogen, —$CH_2CH_2OH$, or —$CH_2COOM$; and M is an alkali metal cation, is prepared by; (a) adjusting the pH of a first aqueous system consisting essentially of water and an amino acid having the formula

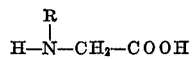

or an alkali metal salt of the acid to about 6–10.5 to form a second aqueous system consisting essentially of the alkali metal salt of the amino acid dissolved in water, and adjusting the temperature of the second aqueous system at about 65–105° C.; and (b) admixing epichlorohydrin with the second aqueous system while; (i) maintaining the pH of the resulting mixture at about 6–10.5; and (ii) maintaining the temperature of the resulting mixture at about 65–105° C. for about 30–180 minutes to form a third aqueous system consisting essentially of an aqueous solution of the chelating agent.

---

This is a division of application Ser. No. 152,987, filed June 14, 1971, now U.S. 3,689,544.

BACKGROUND OF THE INVENTION

This invention is in the field of chelating agents. More specifically, it is directed to the preparation of chelating agents having the formula

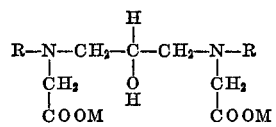

wherein; R is an alkyl group having about 1–20 carbon atoms, hydrogen, —$CH_2CH_2OH$, or —$CH_2COOM$; and M is an alkali metal cation.

U.S. Pat. No. 2,875,049 (Kridel, 96/66) teaches; (a) the preparation of a chelating agent of this type; and (b) its use as a stabilizer in developers for color photography. U.S. Pat. No. 2,656,273 (Henn et al., 95/88) teaches the use of such a chelate in photographic developers. Chemical Abstracts, 1968, 68, 3437 (abstract bridging columns 1 and 2) teaches the preparation of a chelating agent of this type and its use to chelate a number of cations derived from metals.

SUMMARY OF THE INVENTION

In summary, this invention is directed to a process for preparing a chelating agent having the formula

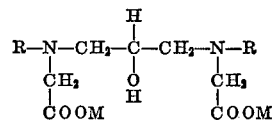

wherein; R is an alkyl group having about 1–20 carbon atoms, hydrogen, —$CH_2CH_2OH$, or —$CH_2COOM$; and M is an alkali metal cation, comprising;

(a) Adjusting the pH of a first aqueous system consisting essentially of water and an amino acid having the formula

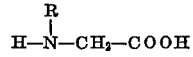

or an alkali metal salt of the acid to about 6–10.5 (preferably about 7.5–8) if the pH is not in this range by adding an alkali metal hydroxide or an acid, preferably as an aqueous solution, as required, to form a second aqueous system (said second aqueous system consisting essentially of the alkali metal salt of the amino acid dissolved in water), and adjusting the temperature of the second aqueous system to about 65–105° C. (preferably about 75–90° C.);

(b) Admixing epichlorohydrin with the second aqueous system while; (i) maintaining the pH of the resulting mixture at about 6–10.5 (preferably about 7.5–8) by adding alkali metal hydroxide, preferably as an aqueous solution, as required; and (ii) maintaining the temperature of the resulting mixture at about 65–105° C. (preferably about 75–90° C.) for about 30–180 minutes (preferably about 60–90 minutes) by heating or cooling as required, to form a third aqueous system consisting essentially of the chelating agent dissolved in water, the epichlorohydrin being supplied at a rate to provide about 0.5–2 (preferably about 0.5–1) moles of epichlorohydrin per mole of said amino acid.

DESCRIPTION OF PREFERRED EMBODIMENTS

In preferred embodiments of the process of the above summary:

(1) M is sodium.
(2) R is —$CH_2COOM$ or —$CH_2CH_2OH$.
(3) R is $CH_3$.
(4) R is hydrogen.

In another preferred embodiment ("Embodiment A") a chelating agent having the formula

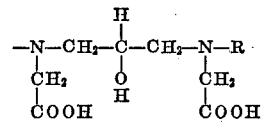

wherein R is an alkyl group having about 1–20 carbon atoms, hydrogen, —$CH_2CH_2OH$, or —$CH_2COOH$, is prepared by: (a) cooling the third aqueous system of the above summary to a temperature below about 50° C. (preferably below about 30° C., e.g., to about 10–29° C.); (b) adjusting the pH of the cooled third aqueous system to about 1.3–2 (preferably about 1.6–1.8), by adding acid (e.g., HCl, $H_2SO_4$, acetic acid, phosphoric acid, pyrophosphoric acid, HBr, or the like) while maintaining the temperature of the resulting mixture below about 50° C. (preferably below about 10–50° C., e.g., to about 10–30° C. or lower) to precipitate the chelating agent having the formula

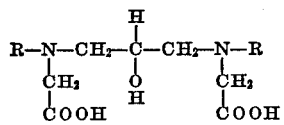

and (c) separating the precipitated chelating agent (e.g., by decantation, centrifugation, or filtration). If desired, the separated and precipitated chelating agent can be washed (e.g., with cold water) and dried (e.g., air dried), or dried with heat (e.g., up to about 50–150° C.), vacuum, or heat (e.g., up to about 100–150° C.) and vacuum. An excellent vacuum for this purpose is a pressure of about 1–700 mm. of mercury absolute.

In preferred embodiments of the process of Embodiment A, supra:

(1) R is —$CH_2COOH$.
(2) R is —$CH_3$.
(3) R is hydrogen.
(4) R is $CH_2CH_2OH$.
(5) The separated chelating agent is washed with water (preferably water saturated with the chelating agent) and dried.

In another preferred embodiment ("Embodiment B") this invention is directed to a chelating agent having the formula

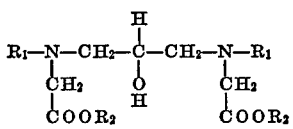

wherein: (a) $R_1$ is a member selected from a first group consisting of an alkyl group having about 1–20 carbon atoms, —$CH_2CH_2OH$, —$CH_2COOR_2$ and hydrogen; and $R_2$ is a member selected from a second group consisting of hydrogen and an alkali metal ion.

In preferred embodiments of Embodiment B, supra:

(1) $R_1$ is —$CH_3$.
(2) $R_1$ is —$CH_2CH_2$ or —$CH_2COOR_2$.
(3) $R_1$ is hydrogen.
(4) $R_2$ is an alkali metal ion.
(5) $R_2$ is hydrogen.

DETAILED DESCRIPTION OF THE INVENTION

In the process of our invention epichlorohydrin is reacted in aqueous medium (which can contain small amounts, e.g., up to at least about 5–10% based on the weight of the water, of a water soluble non-aqueous solvent such as methyl alcohol, ethyl alcohol, a propyl alcohol, dioxane, dimethyl sulfoxide, acetone, or the like, or a mixture of 2 or more of the non-aqueous solvent) with an alkali metal salt of an amino acid to form an alkali metal salt of our chelating agent.

The following equation represents the reaction by which our chelating agent is formed:

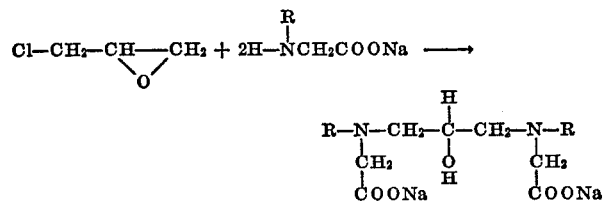

the sodium of the above equation can be replaced with another alkali metal ion—e.g., potassium, lithium, or cesium.

The alkali metal salts of the chelating agents made by our process are excellent chelating agents. These salts, are generally soluble in the aqueous medium in which they are formed, and we have used the thus formed solutions of a number of the salts (including those formed from epichlorohydrin and sodium or potassium salts of: (a) iminodiacetic acid; (b) sarcosine; (c) glycine; and (d) N-hydroxyethylglycine) with excellent results to chelate nickel sulfate, nickel chloride, copper(II) sulfate, copper(II) chloride, zinc nitrate, zinc sulfate, iron(II) chloride; iron(III) chloride; and iron(III) nitrate.

The thus formed chelates of nickel, copper, and zinc were used with excellent results to regulate the concentrations of metal ions in electroplating baths. We have also used the thus formed chelates of zinc and iron with excellent results to supply chelated zinc and chelated iron to growing plants including beans, peas, and watermelons growing in calcareous soil.

If desired, the alkali metal salts of the chelating agents of our invention can be obtained in solid form by evaporating the water therefrom especially where using reduced pressure or by adding a solvent such as dioxane, acetone, propyl alcohol or the like to precipitate the alkali metal salt of the chelating agent. Generally, little advantage is gained by obtaining an alkali metal salt of one of our chelates in solid form, especially since a simple titration can be used to promptly determine the chelating ability or power or strength of a solution of said alkali metal salt, thereby permitting one to readily determine the quantity of solution to be used for chelating a predetermined quantity of an ion (which is generally supplied as a salt of the ion).

A substantial number of chelating agents prepared according to the method or process of our invention are, where in the acid form, substantially insoluble in water. To convert the alkali metal salt of the chelating agent to the agent in its acid form we prefer to adjust the pH of a solution of alkali metal salt of the chelating agent (the solution prepared by reacting an amino acid with an alkali salt of an amino acid in aqueous medium) to about 1.3–2 (preferably about 1.6–1.8) by adding an acid to the solution of alkali salt of the chelating agent. Preferred acids for this purpose are hydrochloric acid, hydrobromic acid, sulfuric acid, phosphorous acid, acetic acid, formic acid, phosphoric acid, and pyrophosphoric acid. Other acids excellently suited for this purpose will be readily apparent to those skilled in the art.

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE I

A 414 g. portion of a 14.7% solution of the disodium salt of iminodiacetic acid ($IDANa_2$) in water was placed in a 1 liter three-neck round bottom flask equipped with a stirrer, a thermometer positioned to detect the temperature of the aqueous phase in the flask, a pH probe, and a dropping funnel. The pH of the solution in the flask was adjusted to about 7.5–8 (by adding aqueous HCl). Then 18.5 g. (0.2 mole) of epichlorohydrin was added over a period of about 15 minutes to the aqueous mixture in the flask while maintaining the pH of the resulting aqueous mixture (in the flask) at about 7.5–8 and while maintaining the temperature of said resulting mixture at about 80–85° C.

Subsequent to adding the epichlorhydrin, the temperature of the resulting mixture in the flask was maintained at about 80–85° C. for about 4 hours. The resulting mixture was then cooled to about 30–40° C. and recovered (placed in a bottle and labeled "Solution No. 1"). Several additional batches of Solution No. 1 were prepared.

EXAMPLE II

The general procedure of Example I was repeated. However, in this instance the resulting mixture was, after cooling, acidified with concentrated (ca. 12 molar) HCl solution, the pH being adjusted to about 1.6–1.8. While acidifying (i.e., adjusting the pH with acid) the resulting mixture was maintained at about 35°–40° C. This treatment (acidification) caused a precipitate to form. The precipitate was separated by filtration, washed with water, and dried at about 100° C. The washed dried product (which was labeled "Product No. 2") weighed 45.3 g. corresponding to a conversion (one pass yield) of 67.5% of theory.

Product No. 2 was identified as 1,3-diaminopropane-2-ol-N,N,N'-N'-tetraacetic acid (i.e., 1,3-diamino-2-propanol-tetraacetic acid) its infrared absorption spectrum, nuclear magnetic resonance (NMR), and elemental analysis. Several other batches of Product No. 2 were prepared.

EXAMPLE III

The general procedure of Example I was repeated. However, in this instance the procedure was modified by replacing the IDANa$_2$ with 2 moles of sodium sarcosinate. Also, in this instance 1 mole of epichlorohydrin was used, and heating after adding the epichlorohydrin (which addition took about 30 minutes) was for a period of 5 hours at about 85° C. The product was cooled, placed in a bottle and labeled "Solution No. 3." Several other batches of Solution No. 3 were prepared.

EXAMPLE IV

The general procedure of Example III was repeated. However, in this instance the pH of the product solution, after cooling to about 34° C. was adjusted to about 1.7 by adding concentrated (ca. 12 molar) HCl solution thereto. No precipitate formed. The resulting acidified product solution was bottled and labeled "Solution No. IV." A sample of the thus formed chelating agent in the form of its sodium salt was separated by use of an ion exchange resin (Ambellite IR-20-H, a cationic resin). The separated material, after conversion to its silyl ester, was identified by gas chromatography as the silyl ester of

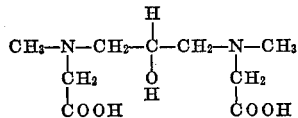

Several other batches of Solution No. IV were prepared.

EXAMPLE V

The general procedure of Example III was repeated. However, in this instance the sodium sarcosinate was replaced with 2 moles of sodium N-hydroxyethylglycinate. The product was bottled and labeled "Solution No. 5." Several other batches were prepared.

EXAMPLE VI

The general procedure of Example IV was repeated. However, in this instance the sodium sarcosinate was replaced with 2 moles of sodium N-hydroxyethylglycinate. No precipitate formed when the pH of the mixture formed by the reaction of the epichlorhydrin and the sodium N hydroxyethylglycinate was adjusted to about 1.7. A silyl ester of product obtained by use of the aforesaid ion exchange resin technique on a portion of the sodium salt solution was identified by the above-mentioned gas chromatographic technique as the silyl ester of

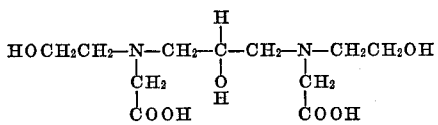

The remainder of the acidified product solution was bottled and labeled "Solution No. 6." Several other batches of Solution No. 6 were prepared.

EXAMPLE VII

The general procedure of Example III was repeated, but in this instance the procedure was modified by replacing the sodium carcosinate with two moles of sodium glycinate. The product was bottled and labeled "Solution No. 7." Several other batches of Solution No. 7 were prepared.

EXAMPLE VIII

The general procedure of Example IV was repeated, but in this instance the procedure was modified by replacing the sodium sarcosinate with 2 moles of sodium glycinate. No precipitate formed when the pH of the cooled product formed by the reaction of epichlorohydrin with sodium glycinate was adjusted to about 1.7. A silyl ester of a portion of the product obtained by the use of the ion exchange resin technique on a portion of the sodium salt solution was identified by a gas chromatographic technique as the silyl ester of

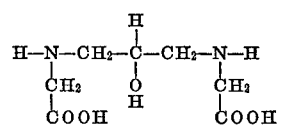

The remainder of the acidified product solution was bottled and labeled "Solution No. 8." Several other batches of Solution No. 8 were prepared.

EXAMPLE IX

An iron chelate of the chelating agent of Example I (i.e., Solution No. 1) was prepared by admixing several batches of Solution No. 1 (i.e., that quantity of Solution No. 1 which was prepared from 1 mole of epichlorhydrin and 2 moles of IDANa$_2$) with 1 mole of FeCl$_3$, the FeCl$_3$ being added as a 37% aqueous solution. While preparing the iron chelate the pH of the system (admixture of Solution No. 1 and the FeCl$_3$ solution) was maintained at about 8 by adding aqueous sodium hydroxide solution (ca. 25% NaOH) as required. The resulting iron(III) chelate was bottled and labeled "Solution No. 9."

Two rows of a species of soybeans which is highly chlorotic and which demands more iron than a normal species of soybeans were planted in a very calcareous soil (pH, ca. 8). During the growing season two applications of Solution No. 9 described supra, were made to one row at a rate to provide about 2 pounds of iron (as Fe) per acre per application while none of said iron(III) chelate was applied to the other row. Except for the applications of said chelate the two rows of soybeans received identical fertilization.

The bean plants which were treated with the chelate were greener and larger than those which were not treated and when harvested the soybeans from the row of treated plants weighed three times as much as those from the row of plants which was not treated with the iron chelate. Both rows were the same length and had the same number of soybean plants growing therein.

EXAMPLE X

The general procedure of Example IX was repeated, but modified by replacing the Solution No. 1 of said example with a quantity of Product No. 2 prepared from 1 mole of epichlorhydrin and 2 moles of IDANNa$_2$. The Product No. 2 was admixed with about 1.5 liters of water, 50% aqueous NaOH was added to bring the pH to about 8 (and to dissolve the Product No. 1 and form a solution thereof); 1 mole of FeCl$_3$ (provided as about a 37% FeCl$_3$ solution) was admixed with the thus formed solution of Product No. 2, adding 50% aqueous NaOH solution as necessary to maintain the pH at about 8.

The resulting iron chelate was used to treat soybeans according to the procedure of Example IX, supra, and results were substantially identical with those of said Example IX.

Iron chelates (pH about 7.5–8) were prepared by the general procedure of Example IX from Solution No. 3, Solution No. 4, Solution No. 5, Solution No. 6, Solution No. 7, and Solution No. 8. (Where the solution was acidic, as in the instance of Solutions No. 4, 6, and 8, it (the solution) was adjusted to about pH 7.5–8 before admixing with FeCl₃ solution.)

Each iron chelate was applied to soybeans according to the procedure of Example IX and in each instance the results were substantially indistinguishable from those of said Example IX.

Copper, manganese, cobalt, zinc, and nickel chelates of Solution No. 1 were prepared by the general procedure of Example IX, wherein the procedure of said example was modified by replacing the FeCl₃ solution with aqueous solutions of copper(II) chloride, cobalt(II) sulfate, manganese(II) sulfate, manganese(II) chloride, nickel(II) chloride, zinc chloride, and zinc acetate.

We have found that the particular salt of the element to be chelated is not critical providing said salt is at least slightly soluble (e.g., preferably at least about 1 g. or more per 100 ml. of water at about 20° C.). We generally prefer to use chloride, sulfate, nitrate, or acetate salts but have used numerous other salts with excellent results.

As used herein, the term "mole" has its generally accepted meaning, i.e., a mole of a substance is that quantity of the substance that contains the same number of molecule of the substance as there are atoms in 12 grams of pure ¹²C.

As used herein, the term "percent (%)" means parts per hundred unless otherwise defined where used, and "parts" means parts by weight. Obviously, percent conversion is a dimensionless number.

As used herein, the term "g." means gram or grams.

As used herein, the term "mm." means millimeter or millimeters.

As used herein, the term "ml." means milliliter or milliliters.

We claim:

1. A process for preparing a chelating agent having the formula

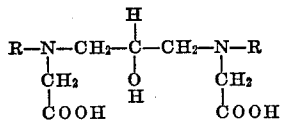

wherein; R is an alkyl group having about 1–20 carbon atoms, hydrogen, —CH₂CH₂OH, or —CH₂COOH, comprising;

(a) adjusting the pH of a first aqueous system consisting essentially of water and an acid having the formula

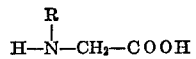

to about 6–10.5 to form a second aqueous system, and adjusting the temperature of the second aqueous system at about 65–105° C.;

(b) admixing epichlorhydrin with the second aqueous system while; (i) maintaining the pH of the resulting mixture at about 6–10.5; and (ii) maintaining the temperature of the resulting mixture at about 65–105° C. for about 30–180 minutes to form a third aqueous system consisting essentially of the chelating agent dissolved in water;

(c) cooling the third aqueous system to a temperature below about 50° C.;

(d) adjusting the pH of the cooled third aqueous system to about 1.3–2 while maintaining the temperature of the resulting mixture below about 50° C. to precipitate the chelating agent having the formula

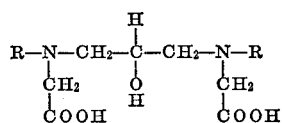

and (e) separating the precipitated chelating agent.

2. The process of claim 1 in which R is —CH₂COOH.
3. The process of claim 1 in which R is —CH₃.
4. The process of claim 1 in which R is hydrogen.
5. The process of claim 1 in which R is —CH₂CH₂OH.
6. The process of claim 1 in which the separated chelating agent is washed with water and dried.

References Cited
UNITED STATES PATENTS

| | | | |
|---|---|---|---|
| 2,532,391 | 12/1950 | Bersworth | 260—534 E |
| 2,673,214 | 3/1954 | Bersworth et al. | 260—534 E |
| 2,806,060 | 9/1957 | Bersworth et al. | 260—534 E |
| 3,515,673 | 6/1970 | Kersner et al. | 260—534 E |
| 3,725,473 | 4/1973 | Sundby | 260—534 E |

VIVIAN GARNER, Primary Examiner

U.S. Cl. X.R.

71—97; 260—429 J, 429.9, 438.1, 439, 448.2 B